UNITED STATES PATENT OFFICE.

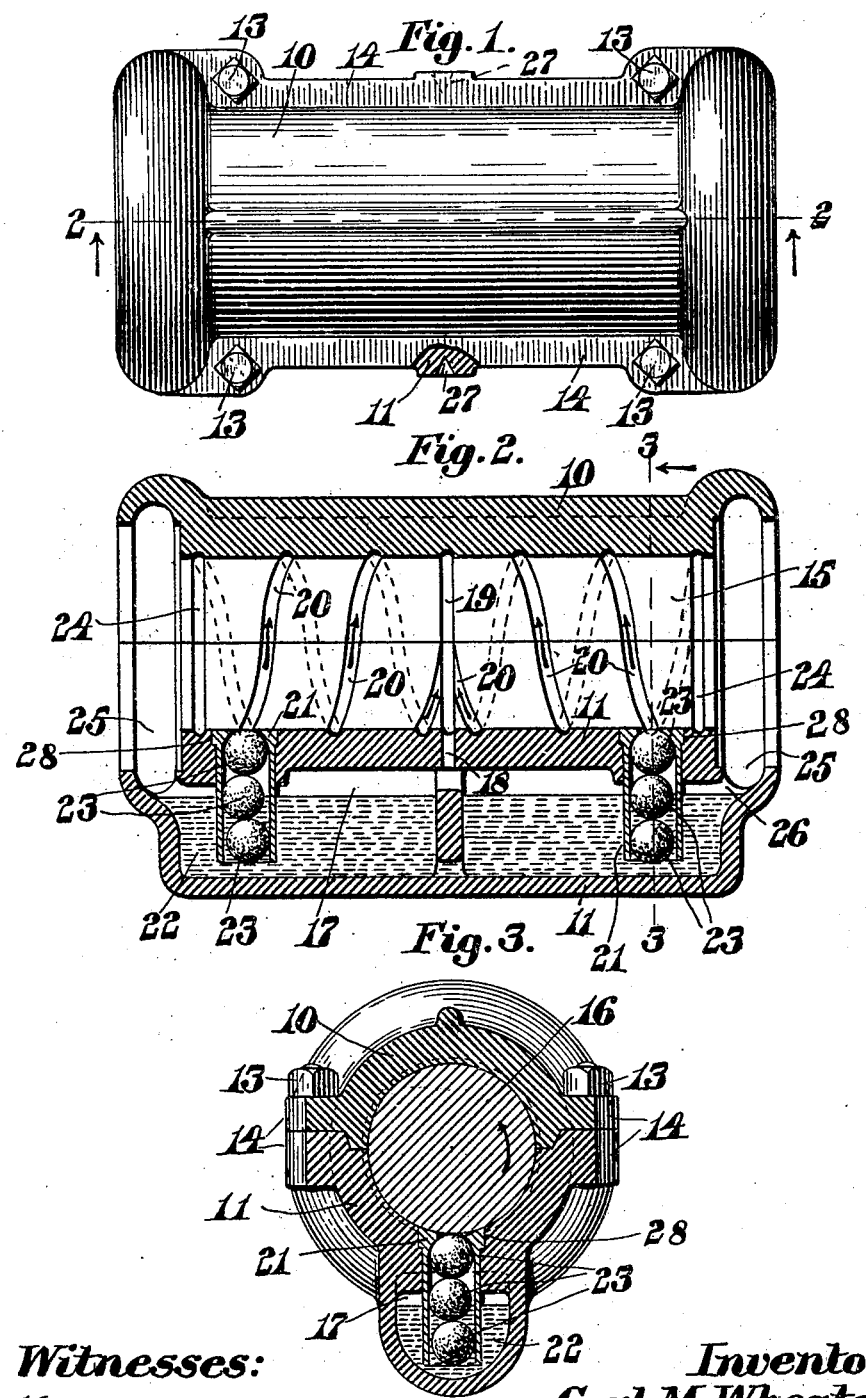

CARL M. WHEATON, OF NEWTONVILLE, MASSACHUSETTS, ASSIGNOR TO GEORGE OTIS DRAPER, OF NEW YORK, N. Y.

SELF-OILING BEARING.

954,836.  Specification of Letters Patent.  Patented Apr. 12, 1910.

Application filed June 19, 1909. Serial No. 503,229.

*To all whom it may concern:*

Be it known that I, CARL M. WHEATON, a citizen of the United States of America, and a resident of Newtonville, in the county of Middlesex and State of Massachusetts, have invented certain new and useful Improvements in Self-Oiling Bearings, of which the following is a specification.

This invention relates to self-oiling bearings for revoluble shafts and has for its object the production of a bearing simple in construction and effective in its operation and which is provided with an oil reservoir and a plurality of buoyant members of non-absorbent material, supported by the oil in said reservoir in contact with the revoluble shaft, said bearing also being provided with a plurality of spiral grooves adapted to receive the oil transferred from the reservoir by said buoyant members, said spiral grooves terminating in an annular groove connected by a passage to said oil reservoir, which permits the oil passing through said spiral grooves to be again delivered into the oil reservoir to be used again.

The invention further consists in certain novel features of construction and arrangement of parts which will be readily understood by reference to the description of the drawings and to the claims hereinafter given.

Of the drawings: Figure 1 represents a plan of the bearing embodying the features of this invention. Fig. 2 represents a vertical section of the same, the cutting plane being on line 2—2 on Fig. 1, showing in full the spiral grooves on one side of the bore and in dotted lines that portion of the grooves that are on the side cut away, and Fig. 3 represents a transverse section of the same, the cutting plane being on line 3—3 on Fig. 2.

Similar characters designate like parts throughout the several figures of the drawings.

In the drawings, 10 and 11 represent, respectively, the top and bottom portions of a bearing secured together by means of bolts 13 passing through the flanges 14 of said top and bottom portions 10 and 11. When said top and bottom portions 10 and 11 are thus secured together by the bolts 13 the bearing has a cylindrical bore 15 adapted to receive a revoluble shaft 16. The bottom portion 11 is provided with an oil reservoir 17 communicating by means of a passage 18 with an annular groove 19 in the wall of said bore 15 intermediate its two ends. The bore 15 is also provided on each side of said annular groove 19 with a spiral groove 20 terminating near the end of said bore 15. Near the outer end of each spiral groove 20 and communicating therewith is located a tubular or cylindrical member 21 open at both ends and set into the bottom portion 11 of the bearing with its lower end extending into the reservoir 17. The opening in the upper end of the member 21 is much smaller than the main bore of said member. The lower ends of the tubular members 21 are slightly removed from the bottom of the reservoir 17, thus permitting the oil 22 to pass into the interior of said tubular members. In the interior of the tubular members 21 are positioned a plurality of floats of cork or some similar buoyant non-absorbent material, these members 23 being preferably spherical and are larger than the end opening in the member 21, the lip thus formed by the reduced end opening affording a means of preventing the displacement of the members 21 when the shaft is removed from the bearing. The spherical members 23 are supported by the oil 22 in the reservoir 17 and are forced upwardly thereby so that the upper ball 23 contacts with the periphery of the shaft 16. As the shaft 16 revolves in the direction of the arrow on Fig. 3, the upper ball 23 is revolved thereby, and this rotation is successively transferred to the other balls beneath and contacting with one another. This rotation of the spherical members 23 causes the oil in which the lower members 23 are immersed to be successively transferred to the surface of the balls above and finally to the surface of the shaft 16. The revolution of the shaft 16 will cause the oil carried by said revoluble members 23 to be delivered into the spiral groove 20, the revolution of the shaft 16 in the direction of the arrow on Fig. 3 causing the oil in the groove 20 to be moved in the direction of the arrows on Fig. 2 of the drawings until any surplus therein, not transferred to the periphery of the shaft, will be deposited in the annular groove 19 and then, pass through the opening 18, into the reservoir 17 again, thus permitting it to be used over again. The bore 15 is also provided near each end with an annular groove 24 communicating with the outer end of each spiral groove which collects a certain amount of oil transferred to the periphery of the shaft, thus lubricating the shaft throughout the length of the bore. The bore outside of these grooves 24 is slightly enlarged so that it will not contact with the revoluble shaft supported by said bearing. Should any oil pass along the shaft beyond the annular groove 24 it will be delivered into the recesses 25 at each end of the bearing and pass through the openings 26 into the oil reservoir 17 but normally the suction in the spiral grooves 20 is such as to prevent the oil from spreading along the shaft outwardly.

The members 21 are inserted through the bore 15 of the bearing and are each provided with a flange 28 which fits a recess in the wall of the bore 15 to position them accurately so that the upper ball 23 will project slightly through the end opening in contact with the shaft 16.

The bearing is pivotally supported in any usual manner by means of depressions 27 adapted to receive the pointed ends of the supporting pins. This makes a very effective form of self-oiling bearing, the oil from the reservoir being continually carried by the rotating spherical floating members against the shaft 16 and into the spiral grooves 20 and annular groove 19 along the entire length of the shaft and then returned to the reservoir for further use. By this construction the outer face of the bearing is always left clean and free from oil, the whole tendency of the oil being to move toward the center of the bearing rather than toward the ends thereof and means being provided to care for this oil when it reaches this central point.

It is believed that the operation and many advantages of the invention will be fully understood from the foregoing.

Having thus described my invention, I claim:

1. A bearing having a cylindrical bore for a revoluble shaft and provided with an oil reservoir beneath said bore, in combination with a tubular member extending from said bore into said reservoir and provided at its upper end with an inwardly projecting lip; and a plurality of revoluble members in substantial alinement from the upper end to the lower end of said tubular member and confined therein by said projecting lip, said members being supported by said oil in contact with each other, the upper of said revoluble members projecting through the reduced opening formed by said lip into contact with said shaft.

2. A bearing having a cylindrical bore for a revoluble shaft and provided with an oil reservoir beneath said bore, in combination with a detachable tubular member extending from said bore into said reservoir and provided at its upper end with an inwardly projecting lip; and a plurality of revoluble members confined within said tubular member by said projecting lip, said members being supported by said oil in contact with each other, the upper of said revoluble members projecting through the reduced opening formed by said lip into contact with said shaft.

3. A bearing having a cylindrical bore for a revoluble shaft and provided with an oil reservoir beneath said bore, in combination with a tubular member extending from said bore into said reservoir and having an opening in its upper end much smaller than its main bore; and floats within said tubular member in substantial alinement from the upper end to the lower end thereof and supported by said oil in contact with each other, said floats being larger than said end opening through which a portion of the periphery of the upper float is adapted to project into contact with said shaft.

4. A bearing having a cylindrical bore for a revoluble shaft and provided with an oil reservoir beneath said bore, in combination with a detachable tubular member extending from said bore into said reservoir and having an opening in its upper end much smaller than its main bore; and floats within said tubular member supported by said oil in contact with each other, said floats being larger than said end opening through which a portion of the periphery of the upper float is adapted to project into contact with said shaft.

5. A bearing having a cylindrical bore for a revoluble shaft and provided with an oil reservoir beneath said bore, in combination with a cylindrical member extending from said bore into said reservoir and having an opening in its upper end much smaller than its main bore; and a plurality of spherical buoyant members within said tubular member in substantial alinement from the upper end to the lower end thereof and supported by said oil in contact with each other, said members being larger than said end opening through which the periphery of the upper buoyant member is adapted to project into contact with said shaft.

6. A bearing having a cylindrical bore for a revoluble shaft and provided with an oil reservoir beneath said bore, in combination with a detachable cylindrical member extending from said bore into said reservoir and having an opening in its upper end much smaller than its main bore; and a plurality of spherical buoyant members within said tubular member supported by said oil in contact with each other, said members being larger than said end opening through which the periphery of the upper buoyant member is adapted to project into contact with said shaft.

7. A bearing having a cylindrical bore for a revoluble shaft provided with a spiral groove terminating in an annular groove, in combination with an oil reservoir beneath said bore and connected to said annular groove by a passage; a cylindrical member extending from a point near the opposite end of said spiral groove into said reservoir and having at its upper end an opening much smaller than its main bore; and floating members of greater diameter than said end opening in said cylindrical member supported in contact with said shaft by the oil in said reservoir.

8. A bearing having a cylindrical bore for a revoluble shaft provided with a spiral groove terminating in an annular groove, in combination with an oil reservoir beneath said bore and connected to said annular groove by a passage; a tubular member extending from the opposite end of said spiral groove into said reservoir and provided with an outwardly extending flange fitting a recess in the walls of said bore; and floating balls in said tube supported in contact with said shaft by the oil in said reservoir.

9. A bearing having a cylindrical bore for a revoluble shaft provided with two spiral grooves extending toward each other into an annular groove, in combination with an oil reservoir beneath said bore and connected to said annular groove by a passage; a tubular member extending from the opposite end of each spiral groove into said reservoir and having at its upper end an opening much smaller than its main bore; and a float in each tube supported by said oil in contact with said shaft through said end opening.

10. A bearing having a cylindrical bore for a revoluble shaft provided with two spiral grooves extending toward each other into an annular groove, in combination with an oil reservoir beneath said bore and connected to said annular groove by a passage; a cylindrical member extending from the opposite end of each spiral groove into said reservoir and having at its upper end an opening smaller than its main bore and an outwardly extending flange adapted to position it relative to said bore; and a plurality of buoyant balls in each tube supported by said oil with the upper one in contact with said shaft, said balls being larger than said opening.

11. A bearing having a cylindrical bore for a revoluble shaft and provided with an oil reservoir beneath said bore in combination with a tubular member radiating from said bore with one end extending nearly to the bottom of said reservoir and its opposite end having a reduced opening; and a plurality of superimposed buoyant members confined within said tubular member, the upper one of which is above the level of the oil in said reservoir and contacts with the said shaft through said reduced opening.

Signed by me at 4 Post Office Sq., Boston, Mass., this 16th day of June, 1909.

CARL M. WHEATON.

Witnesses:
  EDNA C. CLEVELAND,
  NATHAN C. LOMBARD.